United States Patent
Marcovitch et al.

(10) Patent No.: US 12,373,355 B2
(45) Date of Patent: Jul. 29, 2025

(54) NETWORK ADAPTER PROVIDING ADDRESS TRANSLATION AS A SERVICE

(71) Applicant: MELLANOX TECHNOLOGIES, LTD., Yokneam (IL)

(72) Inventors: Daniel Marcovitch, Yokneam Illit (IL); Eliav Bar-Ilan, Or Akiva (IL); Liran Liss, Atzmon-Segev (IL)

(73) Assignee: Mellanox Technologies, Ltd, Yokneam (IL)

( * ) Notice: Subject to any disclaimer, the term of this patent is extended or adjusted under 35 U.S.C. 154(b) by 191 days.

(21) Appl. No.: 18/353,123

(22) Filed: Jul. 17, 2023

(65) Prior Publication Data

US 2025/0028648 A1    Jan. 23, 2025

(51) Int. Cl.
  *G06F 12/1072*  (2016.01)
  *H04L 67/1097*  (2022.01)

(52) U.S. Cl.
  CPC ...... *G06F 12/1072* (2013.01); *H04L 67/1097* (2013.01)

(58) Field of Classification Search
  CPC ............ G06F 12/1072; H04L 67/1097
  See application file for complete search history.

(56) References Cited

U.S. PATENT DOCUMENTS

| | | | |
|---|---|---|---|
| 9,298,642 B2 | 3/2016 | Kagan et al. | |
| 9,632,901 B2 | 4/2017 | Raikin et al. | |
| 9,639,487 B1 | 5/2017 | Wentzlaff et al. | |
| 9,648,081 B2 | 5/2017 | Raikin et al. | |
| 9,996,498 B2 | 6/2018 | Shahar et al. | |
| 10,031,857 B2 | 7/2018 | Menachem et al. | |
| 10,120,832 B2 | 11/2018 | Raindel et al. | |
| 10,367,741 B1 | 7/2019 | Ramey et al. | |
| 10,789,175 B2 | 9/2020 | Tal et al. | |
| 11,502,912 B2 | 11/2022 | Levy et al. | |
| 11,620,245 B2 | 4/2023 | Oved et al. | |
| 2011/0083064 A1 | 4/2011 | Kagan et al. | |
| 2013/0315237 A1 | 11/2013 | Kagan et al. | |
| 2014/0089450 A1 | 3/2014 | Raindel et al. | |
| 2014/0089528 A1 | 3/2014 | Bloch et al. | |
| 2014/0122828 A1 | 5/2014 | Kagan et al. | |

(Continued)

OTHER PUBLICATIONS

PCI-SIG, "PCI Express® Base Specification Revision 6.0," version 1.0, published document, pp. 1-1923, Dec. 16, 2021.

(Continued)

*Primary Examiner* — Larry T MacKall
(74) *Attorney, Agent, or Firm* — Meitar Patents Ltd.; Daniel Kligler

(57) ABSTRACT

A network adapter including a host interface, a network interface, packet processing circuitry, and Translation-as-a-Service (TaaS) circuitry. The host interface is to communicate with a host over a peripheral bus. The network interface is to send and receive packets to and from a network for the host. The packet processing circuitry is to process the packets. The TaaS circuitry is integrated in the network adapter and is to (i) receive from a requesting device a request to translate an input address into a requested address in a requested address space, (ii) translate the input address into the one or more requested addresses, and (iii) return the one or more requested addresses to the requesting device.

18 Claims, 3 Drawing Sheets

(56) References Cited

U.S. PATENT DOCUMENTS

| | | | |
|---|---|---|---|
| 2016/0077946 A1* | 3/2016 | Raikin | G06F 12/1009 |
| | | | 710/14 |
| 2019/0173810 A1* | 6/2019 | Shpiner | H04L 47/6225 |
| 2020/0278935 A1 | 9/2020 | Borikar et al. | |
| 2021/0216215 A1* | 7/2021 | Wigmore | G06F 9/542 |
| 2023/0409487 A1 | 12/2023 | Sandberg | |

OTHER PUBLICATIONS

CXL Consortium, "CXL™ Consortium Releases Compute Express Link™ 2.0 Specification", Press Release, pp. 1-2 Nov. 10, 2020.
NVIDIA Corporation, "NVIDIA Opens NVLink for Custom Silicon Integration", Press release, pp. 1-2, Mar. 22, 2022.
Shalom et al., U.S. Appl. No. 18/299,732, filed Apr. 13, 2023.
U.S. Appl. No. 18/299,732 Office Action dated Aug. 14, 2024.
PCI-SIG, "PCI Express® Base Specification Revision 5.0," version 1.0, chapter 10, pp. 1169-1209, May 22, 2019.

* cited by examiner

NETWORK ADAPTER PROVIDING ADDRESS TRANSLATION AS A SERVICE

FIELD OF THE INVENTION

The present invention relates generally to network adapters, and particularly to network adapters that provide address translation services.

BACKGROUND OF THE INVENTION

Network adapters often operate in accordance with communication or memory-access protocols that involve address translations. In Remote Direct Memory Access (RDMA), for example, a network adapter is capable of transferring data directly between a local host memory and a remote host. Physical Address (PA) ranges in the host memory are mapped to respective Virtual Address (VA) ranges. The network adapter receives memory access commands that are specified in terms of VAS and translates the VAs into corresponding PAS.

As another example, in Single-Root Input-Output Virtualization (SR-IOV), a host runs one or more Virtual Machines (VMs) that are assigned respective Machine Address (MA) ranges. Memory access in such an environment may involve, in addition to translation between VAs and PAs, a translation between PAs and MAs. The latter translation may be performed by an Input-Output Memory Management Unit (IOMMU) in the host. The network adapter and the host may use an Address Translation Service (ATS) that allows the network adapter to query the IOMMU for address translations, and to cache address translations in a local Address Translation Cache (ATC).

SUMMARY OF THE INVENTION

An embodiment that is described herein provides a network adapter including a host interface, a network interface, packet processing circuitry, and Translation-as-a-Service (TaaS) circuitry. The host interface is to communicate with a host over a peripheral bus. The network interface is to send and receive packets to and from a network for the host. The packet processing circuitry is to process the packets. The TaaS circuitry is integrated in the network adapter and is to (i) receive from a requesting device a request to translate an input address into a requested address in a requested address space, (ii) translate the input address into the one or more requested addresses, and (iii) return the one or more requested addresses to the requesting device.

In some embodiments, the TaaS circuitry is to translate the input address into the one or more requested addresses independently of any actual memory access operation. In some embodiments, the TaaS circuitry is to receive a translation request specifying an input address for which no translation exists, and to respond to the translation request with a translation response indicating that no translation exists. In an example embodiment, the request specifies a requested size, and the TaaS circuitry is to return, in the response, a memory range having the requested size.

In some embodiments, the input address includes a network-adapter Virtual Address (VA). In an example embodiment, the VA includes a network-adapter VA. In another embodiment, the input address includes a key-address pair. In yet another embodiment, the input address includes a transport address.

In a disclosed embodiment, in addition to returning the one or more requested addresses, the TaaS circuitry is to further return metadata corresponding to the one or more requested addresses. In various embodiments, the one or more requested addresses include one of (i) a Virtual Address (VA), (ii) a Physical Address (PA) and (iii) a Machine Address (MA). In an embodiment, the TaaS circuitry is to receive the request as a work-request posted on a queue pair (QP), and to return the one or more requested addresses by posting on the QP a completion notification specifying the one or more requested addresses.

In an embodiment, the input address points to one of (i) a contiguous memory range and (ii) a pattern of memory addresses. In some embodiments, the request is received in response to an On-Demand Paging (ODP) page-fault notification in which the network adapter notifies the requesting device of an unmapped memory page, the request requesting an input address to which the unmapped memory page is to be mapped.

In another embodiment, the request specifies a Virtual Address (VA) in a logical volume defined on a storage device, the request requesting a corresponding address on the storage device. In yet another embodiment, the request requests translation of a Virtual Address (VA) into a Physical Address (PA) responsively to receiving a storage command of a remote storage access protocol, the command specifying the VA.

In still another embodiment, the request requests translation of the VA into a Physical Address (PA) responsively to encountering an Address Translation Service (ATS) permission error. In another embodiment, the request requests translation of the input address into a Machine Address (MA).

There is additionally provided, in accordance with an embodiment that is described herein, a method in a network adapter. The method includes communicating with a host over a peripheral bus, and sending and receiving packets to and from a network for the host. Using Translation-as-a-Service (TaaS) circuitry, which is integrated in the network adapter: (i) a request, to translate an input address into a requested address in a requested address space, is received from a requesting device, (ii) the input address is translated into the one or more requested addresses, and (iii) the one or more requested addresses are returned to the requesting device.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved techniques for address translation and memory access in computing systems. In the disclosed embodiment, a network adapter, e.g., an Ethernet Network Interface Controller (NIC) or InfiniBand™ Host Channel Adapter (HCA), connects a host to a network. In addition to sending and receiving packets for the host, the network adapter provides address translation as a service to a requesting device.

The requesting device may be external to the network adapter, e.g., in the host or remotely across the network. Alternatively, the requesting device may be internal in the network adapter, e.g., when the network adapter is a "Smart-NIC" or Data Processing Unit (DPU).

In a typical Translation-as-as-Service (TaaS) transaction, the network adapter receives a request from a requesting device to translate an input address into a requested Address in some other address space. The input address may be, for example, a Virtual Address (VA) or a transport address. The network adapter performs the requested translation and returns the requested address to the requesting device. In various embodiments, the network adapter may translate the input address into another VA, into a PA, or into a MA. In an example embodiment, the requested address is a VA or PA in an address space of the network adapter (as opposed to an address space of the host).

Various use-cases of the various types of TaaS transactions are described herein. The Taas techniques described herein decouple the address translation operation from the actual The disclosed techniques also improve memory-access performance. Moreover, the disclosed techniques relieve the requesting device (e.g., host) of the need to continually maintain a parallel copy of the underlying structure and logic of the address translation. For example, a host can be relieved of the need to emulate a Translation Protection Table (TPT) maintained in the network adapter.

System Description

Figure 1:
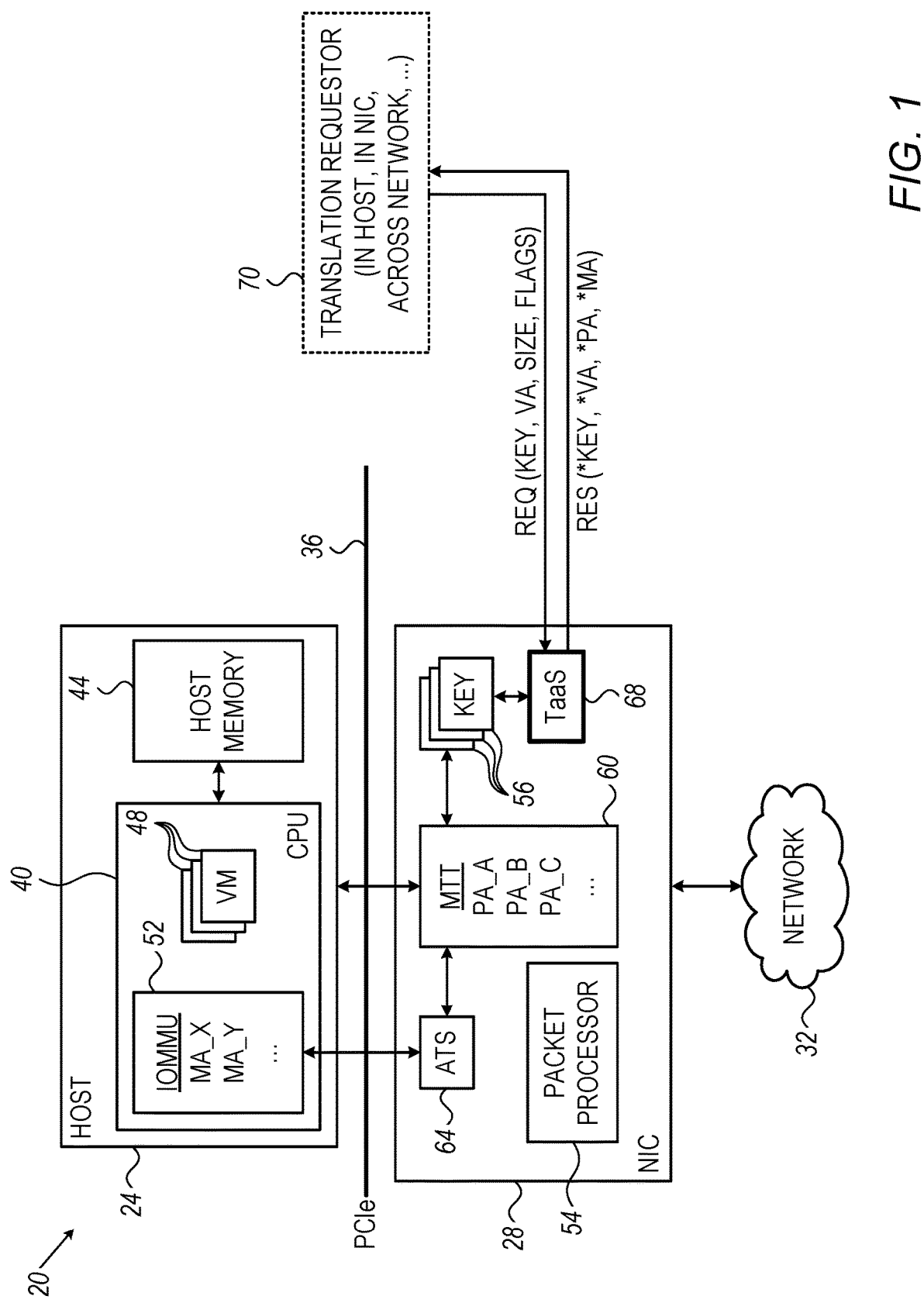
FIG. 1 is a block diagram that schematically illustrates a computing system including a network adapter that performs Address Translation-as-a-Service (TaaS), in accordance with an embodiment of the present invention.

FIG. 1 is a block diagram that schematically illustrates a computing system 20 including a host 24 and a network adapter that performs Address Translation-as-a-Service (TaaS), in accordance with an embodiment of the present invention.

Host 24 may comprise, for example, a server, a workstation, or any other suitable computer. Network adapter 28 may comprise, for example, an NIC or an InfiniBand HCA. Network adapter 28 connects host 24 to a network 32, e.g., an Ethernet or InfiniBand network. The description that follows refers to a NIC, by way of non-limiting example.

Host 24 and NIC 28 communicate with one another over a peripheral bus. In the present example the peripheral bus comprises a PCIe bus 36. In alternative embodiments, however, any other suitable type of peripheral bus can be used, e.g., CXL, Nvlink or Nvlink-C2C.

Host 24 comprises a Central Processing Unit (CPU) 40 and a host memory 44. Device 28 may comprise an on-device memory (not seen in the figure). Host 24 and NIC 28 run a virtualized environment in accordance with SR-IOV. CPU 40 runs one or more Virtual Machines (VMs) 48. CPU 40 further runs an IOMMU 52.

NIC 28 comprises a host interface for communicating with host 24 over bus 36, and a network interface for sending and receiving packets to and from network 32 for host 24 (the two interfaces are omitted from FIG. 1 for the sake of clarity). NIC 28 comprises a packet processor 54, also referred to as "packet processing circuitry", which is responsible for sending and receiving packets over network 32 for host 24. In addition, NIC 28 comprises a Taas unit, also referred to as "TaaS circuitry" or "TaaS controller", which provides address translation services to one or more translation requestors 70 using methods that will be described in detail below.

A given translation requestor (also referred to herein as "requesting device" or simply "requestor") may be internal or external to NIC 28. An external requestor may comprise, for example, software running in host 24, i.e., across PCIe bus 36. As another example, an external requestor may be a remote host or network device that communicates with NIC 28 over network 32. An internal requestor may comprise any software or hardware that resides within NIC 28.

In some embodiments, access to host memory 44 involves various address translations. The description that follows refers mainly to memory access that is part of an RDMA transaction that is issued by a remote host and handled by NIC 28.

Typically, an RDMA transaction (e.g., read or write) accesses a certain VA that belongs to a virtual address space. The virtual address space is identified by a unique key, also referred to as MKEY. Thus, the RDMA transaction will typically specify a {VA, key} pair. NIC 28 comprises a Memory Translation Table (MTT) 60 and one or more keys 56. For each key 56, MTT 60 holds a table that translates {VA, key} pairs into respective PAs. In the present context, the term "VA" also refers to a {VA, key} pair. MTT 60 is one example implementation of a Translation Protection Table in (TPT) NIC 28. Alternatively, any other suitable TPT implementation can be used.

In environments that do not use virtualization (sometimes called "bare metal" environments), the PAs specify actual physical storage locations in host memory 44. When using SR-IOV, as in the example of FIG. 1, the PAs should undergo an additional translation into MAs. Translation of PAs into MAs is performed by IOMMU 52. In some embodiments, NIC 28 comprises an Address Translation Service (ATS) unit 64, which sends translation requests (requests for translating PAs into MAs) to IOMMU 52, receives the requested translations and caches the translations in an Address Translation Cache (ATC).

In embodiments of the present invention, TaaS unit 68 in NIC 28 provides address translation services to internal and/or external requestors 70. The address whose translation is requested is referred to herein as an "input address". The description below refers mainly to embodiments in which the input address is a VA. In some embodiments, however, the input address is a transport address, e.g., a {Queue Pair (QP), Work Queue Element (WQE) index, byte offset} triplet). Example uses of transport addresses are outlined further below.

In some embodiments, a requestor 70 sends NIC 28 a TaaS request having the format REQ (key, VA, size, flags). The TaaS request requests NIC 28 to translate a memory range that starts at the specified VA and has the specified size. The VA belongs to a virtual address range having the specified key. TaaS unit 68 in NIC 68 responds to the request with a TaaS response having the format RES (*key, *VA,

*PA, *MA), wherein the "*" operator stands for "zero or more". The response returns the requested address, which may be a VA, a PA or a MA depending on implementation and use-case.

In an embodiment, TaaS unit 68 may operate in a batch mode. In this embodiment, TaaS unit 68 is provided with a list of translation requests and returns a series of translation responses. This implementation is efficient in terms of posting overheads.

In some cases, a given translation result may comprise multiple translation records to cover the requested VA range. In some embodiments, Taas unit 68 translates the input address into a non-contiguous range of addresses (e.g., VAs or PAs) having some compact representation, e.g., a strided pattern of addresses).

In various embodiments, TaaS unit 68 includes in a TaaS response, in addition to the requested address, metadata relating to the requested address. The metadata may comprise, for example, an access permission, one or more PCIe ordering rules, a key, a Process Address Space Identifier (PASID), an identifier of the requestor, a device identifier, a namespace identifier, an identifier of a destination host, a virtual hop identifier, and/or any other suitable metadata. In some embodiments a given TaaS response may comprise multiple translations that are returned for a given request. A given TaaS response may comprise a length indication specifying a subset of the TaaS request to which the response pertains.

In some embodiments, the VA whose translation is requested is also referred to as a "network-adapter VA" or "NIC VA". When translating a VA into another VA, the latter VA may comprise, for example, another NIC VA (e.g., a {key, address} pair), a host VA (e.g., a {PASID, address} pair), a guest VA (e.g., a {requestor id, PASID, address} pair), or any other type of VA. In addition to TaaS requests of the form {KEY, VA}, TaaS unit 68 may also receive requests in other suitable namespaces, e.g., a request to translate from a {PASID, VA} to a PA.

In various embodiments, requestors 70 and TaaS unit 68 may use various interfaces for exchanging TaaS requests and TaaS responses. In one embodiment, the interface comprises a Queue Pair (QP) comprising a Work Queue (WQ) and a Completion Queue (CQ). In this implementation, requestor 70 posts a TaaS request as a Work Queue Element (WQE) on the WQ. TaaS unit 68 reads and executes the WQE, and posts the TaaS response as a Completion Queue Element (CQE) on the CQ. In other embodiments, requestor 70 and TaaS unit 68 exchange TaaS requests and responses over a command interface or some dedicated interface that is set up between them.

In some embodiments, in processing a TaaS request, TaaS unit 68 may find that the requested translation does not currently exist. In such a case, TaaS unit 68 typically returns the location (e.g., input address) of the missing translation entry along with an indication that the translation does not exist. In an embodiment, if requested, Taas unit 68 returns all translated addresses and locations of missing translations for the given VA range. This feature is useful for the requestor to prefetch all missing translation entries for a given translation request.

In some embodiments, MTT 60 comprises multiple mapping tables arranged in two or more nesting levels. In other words, an entry in a given mapping table in MTT 60 may point to another {Key, pair. VA} In these embodiments, TaaS unit 68 may return missing translations found at any of the nesting levels.

It is important to distinguish between ATS and Taas. ATS is specified as part of the PCIe specification, e.g., in Chapter 10 of "PCI Express® Base Specification," Revision 5.0, Version 1.0, May 2019. In ATS, address translation is performed by the host, as a service to NIC 28. An ATS transaction (either with the IOMMU or with the ATC) is typically performed as part of an actual memory access operation (e.g., read or write). I In Taas, in contrast, address translation is performed in NIC 28 as a service to some requesting device. A TaaS transaction is not necessarily part of (and is often independent of) any specific memory access operation.

The configurations of system 20, host 24 and network adapter 28, as shown in FIG. 1, are example configurations that are chosen purely for the sake of conceptual clarity. In alternative embodiments, any other suitable system, host and/or network adapter configuration can be used. Elements that are not necessary for understanding the principles of the present invention, such as various interfaces, addressing circuits, timing and sequencing circuits and debugging circuits, have been omitted from the figures for clarity.

The various elements of system 20, host 24 and network adapter 28 may be implemented in hardware, e.g., in one or more Application-Specific Integrated Circuits (ASICs) or FPGAs. Additionally or alternatively, elements of system 20, host 24 and/or network adapter 28 may be implemented using software, or using a combination of hardware and software elements. Host memory 44 may comprise any suitable type of memory, e.g., one or more Random-Access Memory (RAM) devices.

In some embodiments, CPU 40 and/or TaaS unit 68 may be implemented, in part or in full, using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

VA-to-VA Translation Examples

In some embodiments, TaaS unit 68 translates a VA (or a {VA, key} pair) into another VA. The two VAs typically belong to different virtual address spaces, i.e., associated with different keys.

One example use-case for VA-to-VA translation is the case of On-Demand Paging (ODP). In ODP, MTT 60 does not initially hold translations for the entire virtual address space. Instead, PAs are assigned and translations are specified when required. In ODP, if NIC 28 receives a memory access request (e.g., RDMA command) that addresses a VA that is not yet mapped to any PA, the NIC notifies host 24 of a "page fault" event. Conventionally, to resolve the page fault and map the VA to a new PA, the host needs to continuously emulate the structure and logic of the VA-to-PA address translation implemented in the NIC.

In some embodiments of the present invention, the need for such emulation is eliminated using TaaS. In these embodiments, upon receiving a "page fault" notification from NIC 28, host 24 sends a TaaS request back to the NIC. TaaS unit 68 responds to the TaaS request with a TaaS response that specifies a new VA associated with a different key, the new VA pointing to the currently nonexistent PA.

Figure 2:
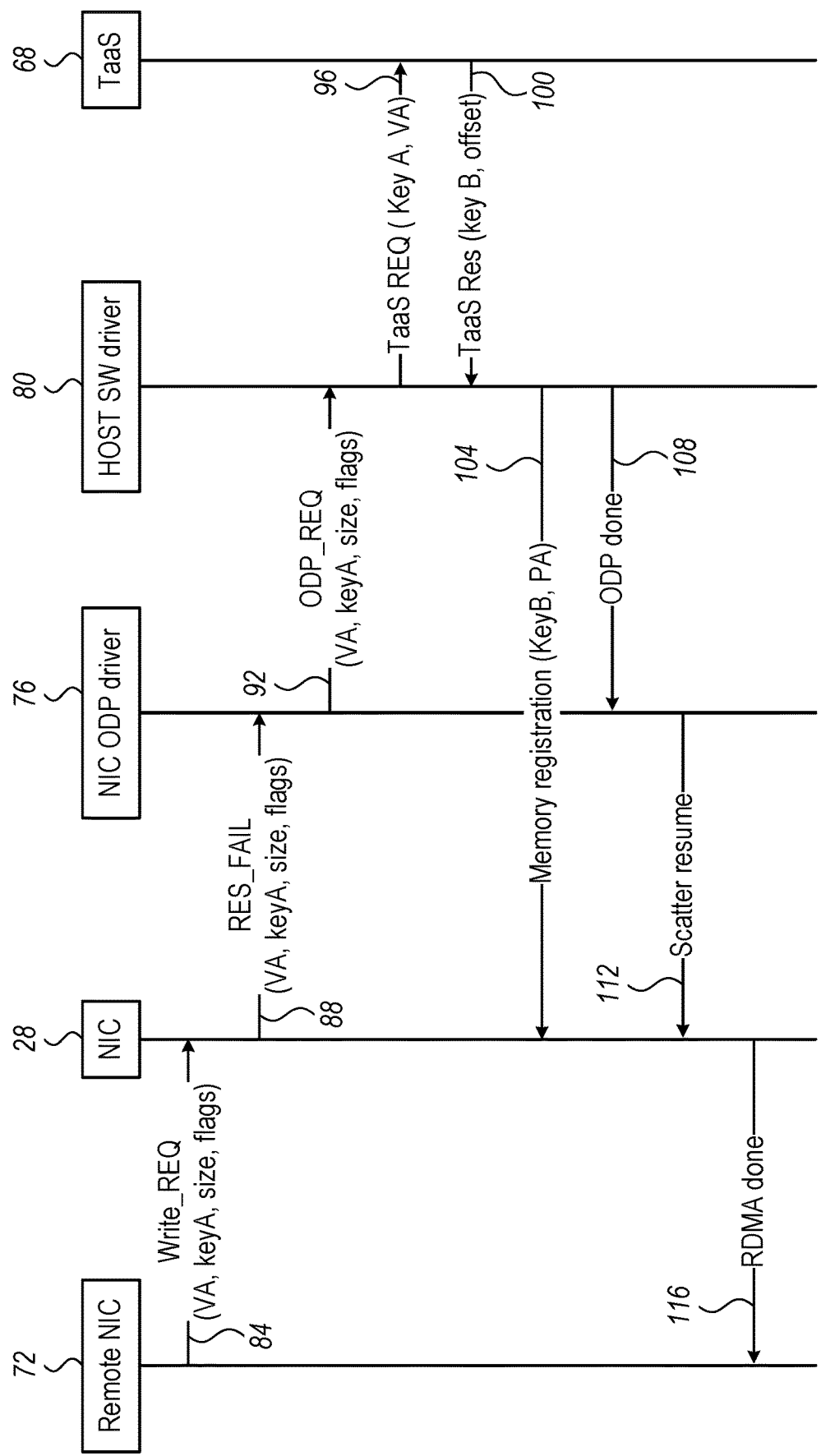
FIG. 2 is a message-flow diagram that schematically illustrates the use of TaaS in On-Demand Paging (ODP), in accordance with an embodiment of the present invention.

FIG. 2 is a message-flow diagram that schematically illustrates the use of TaaS in On-Demand Paging (ODP), in accordance with an embodiment of the present invention. The figure describes handling of an RDMA write command received from a remote NIC 72. The command is handled by a NIC ODP driver 76 and by TaaS unit 68, both residing in NIC 28. Driver 76 and unit 68 communicate with a host software driver 80 running on CPU 40 of host 24. Host software driver 80 acts as translation requestor 70.

The process begins with remote NIC 72 sending an RDMA write command ("Write REQ") to NIC 28, at a write requesting stage 84. The write command specifies (i) a VA and (ii) a key denoted keyA. In the present example, NIC 28 looks-up the {VA, keyA} pair in MTT 60 and finds that this VA in currently unmapped. NIC 28 therefore sends a page fault notification ("RES FAIL") to NIC ODP driver 76, at a page fault notification stage 88. The notification specifies the {VA, keyA} pair for which the page fault has occurred. At an ODP requesting stage 92, NIC ODP driver 76 sends an ODP request ("ODP REQ") to host software driver 80. The ODP request specifies the {VA, keyA} pair for which a new PA mapping is requested.

Host software driver 80 responds to the ODP request by issuing a TaaS request ("TaaS REQ") to TaaS unit 68 in NIC 28, at a TaaS requesting stage 96. The TaaS request specifies the {VA, keyA} pair in question. At a TaaS responding stage 100, TaaS unit 68 responds with a TaaS response ("TaaS RES") that specifies (i) a (same or different) key denoted keyB, and (ii) an offset relative to the start address of the address space of keyB that points to the requested PA.

At a registration stage 104, host software driver 80 registers the {keyB, PA} pair in NIC 28. Host software driver 80 notifies NIC ODP driver 76 that the assignment is completed, at an ODP completion stage 108. At a scatter resumption stage 112, NIC ODP driver 76 notifies NIC 28 that data scattering of the write command (scattering of the data to memory 44) can resume. When NIC 28 completes the RDMA write command, the NIC sends a completion message to remote NIC 72, at an acknowledgement stage 116.

The ODP use case described above is chosen purely by way of example. In alternative embodiments, TaaS unit 68 may provide VA-to-VA translation services as part of any other scenario. One alternative example relates to Logical Volume Management (LVM) in storage applications. In LVM, a host (e.g., a storage controller) typically translates between two virtual address spaces defined for a storage device, one referred to as a Logical-Volume (LV) space and the other referred to as a Physical-Volume (PV) space. In an embodiment, the translation is from a client front-end logical {device, namespace, Logical Block Address (LBA)} into a server back-end physical {device, namespace, address}. Taas unit 68 can offload the host of these VA-to-VA translation tasks, by providing the translation as a service to the host.

As noted above, in some embodiments the input address to TaaS unit 68 is a transport address comprising a {Queue Pair (QP), Work Queue Element (WQE) index, byte offset} triplet). Translation of a transport address can be used, for example, for fault handling in ODP, for prefetching in ODP (e.g., scanning pending WQEs and ensuring all translations are present, and not, proactively handle faults), as well as for debugging (e.g., listing all translations accessed by a certain WQE).

VA-To-PA Translation Examples

In some embodiments, TaaS unit 68 translates a VA (or a {VA, key} pair) into a PA. In a virtualized environment, the PA may also be referred to as a Guest PA (GPA). One example use-case for VA-to-PA translation is the case of the Page Request Interface (PRI). PRI is specified, for example, in section 10.1.2 of "PCI Express® Base Specification," Revision 5.0, Version 1.0, cited above. The terms "PRI" and "page request service" are used interchangeably in PCIe terminology.

Figure 3:
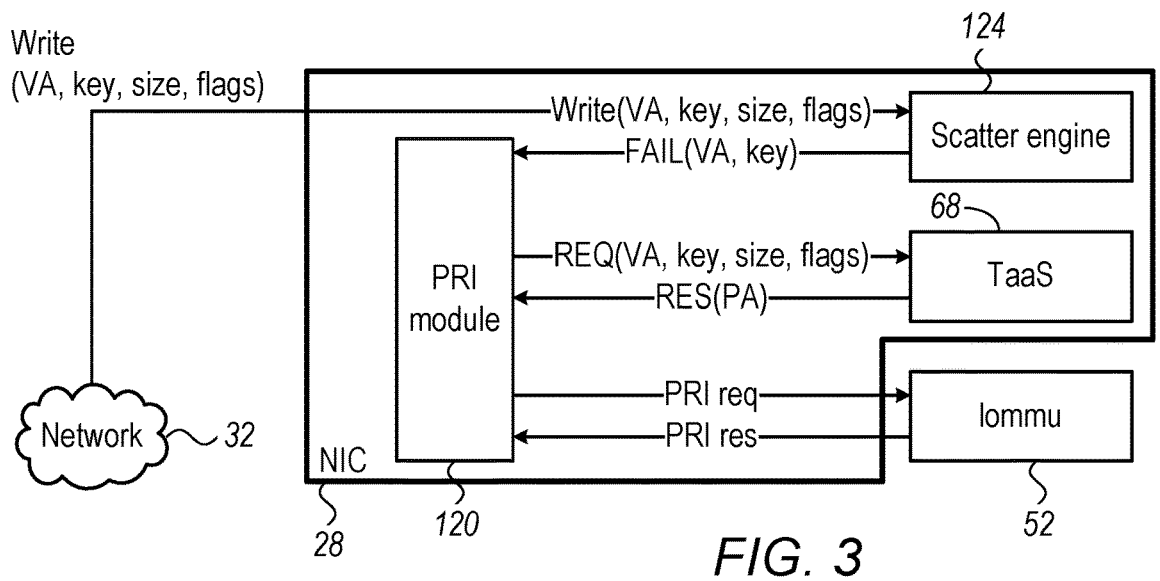
FIG. 3 is a block diagram that schematically illustrates the use of TaaS in Page Request Interface (PRI), in accordance with an embodiment of the present invention.

FIG. 3 is a block diagram that schematically illustrates the use of TaaS in PRI, in accordance with an embodiment of the present invention. For clarity, the figure shows only the relevant components of host 24 and NIC 28. In this example, NIC 28 comprises, in addition to TaaS unit 68, a PRI module 120 and a scatter engine 124 (depicted in the figure externally to the NIC, purely for convenience).

The PRI scenario begins when NIC 28 receives an RDMA write command over network 32. The write command specifies a VA range to which data is to be scattered, e.g., using the format Write (VA, key, size, flags). The write command is sent to scatter engine 124 for execution. In the present example, scatter engine 124 finds that the requested VA is currently unmapped, e.g., receives an ATS translation error. The scatter engine therefore sends a failure message having the format FAIL (VA, key) to PRI module 120.

In response to the failure message, PRI module 120 sends a TaaS request (with the format REQ (VA, key, size, flags)) to TaaS unit 68. The TaaS request requests a translation of the VA into a corresponding PA. TaaS unit 68 performs the translation and returns the requested PA in a TaaS response having the format RES (PA). The PRI process may now resume, with PRI module 120 issuing a PRI request to IOMMU 52, and IOMMU 52 returning a MA in a PRI response. At this stage, NIC 28 may retry the RDMA write command, now successfully.

In another example use case, TaaS unit 68 provides VA-to-PA translation service to software that stores and retrieves data in a storage device that supports only PAs. For example, NVMe-over-Fabrics (NVMe-oF) specifies a {NIC key, VA} pair for a buffer to/from which an NVMe storage device should write. The NVMe device may need to receive a physical address list ("PRPs"). The NVMe-OF driver needs to translate the {key, VA} from a remote request into a list of physical addresses. This configuration, however, already exists in the network device since the translation was used to scatter (for IO write) or will be used to gather (for IO read) from the buffer which is passed to the Nvme device. In some embodiments, TaaS can be used to save the page table duplication, which in turn can provide higher throughput due to compute savings.

Figure 4:
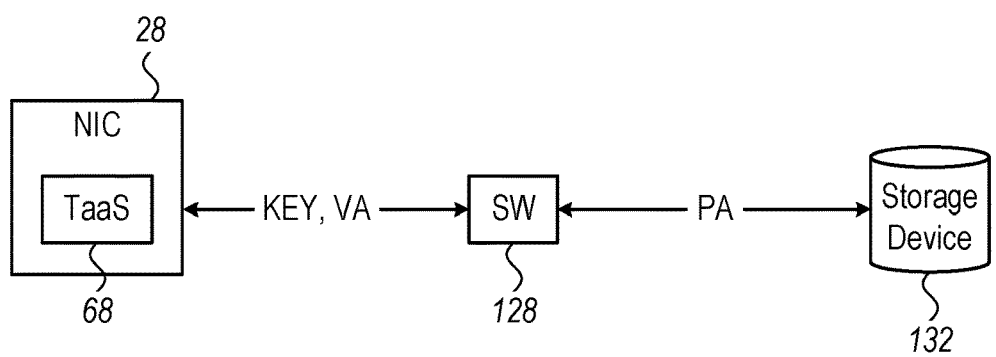
FIG. 4 is a block diagram that schematically illustrates the use of TaaS for storage in a storage device that is accessible using physical addresses, in accordance with an embodiment of the present invention.

FIG. 4 is a block diagram that schematically illustrates the use of TaaS for storage and retrieval in a storage device that is accessible using physical addresses, in accordance with an embodiment of the present invention. In the present example, certain software (SW) 128 in host 24 communicates over PCIe bus 36 both with NIC 28 and with a storage device 132 (e.g., a Solid-State Drive-SSD). Storage device 132 is accessed by PAs, but SW 128 receives (or generates) storage commands specified in terms of VAs.

In some embodiments, TaaS unit 68 translates {VA, key} pairs into corresponding PAs, as a service to SW 128. SW 128 and TaaS unit 68 may communicate using the above-described interface of TaaS requests and TaaS responses. This technique obviates the need for SW 128 to maintain a dictionary that maps {VA, key} into PAs.

Further alternatively, TaaS unit 68 may provide VA-to-PA translation services as part of any other scenario.

VA-To-MA Translation Examples

In some embodiments, TaaS unit 68 translates a VA (or a {VA, key} pair) into a MA.

Figure 5:
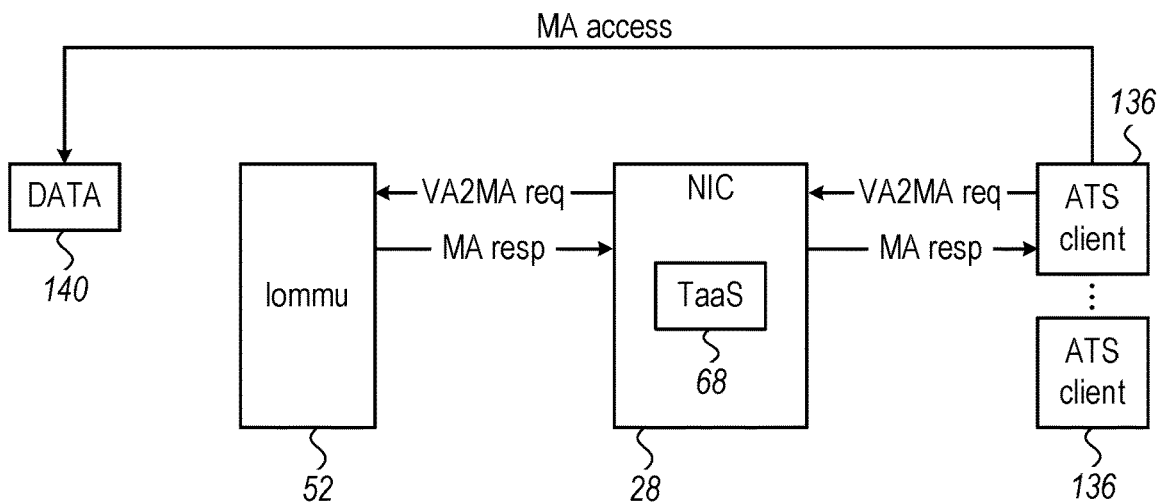
FIG. 5 is a block diagram schematically that illustrates the use of TaaS in translation of Virtual Addresses (VAs) into Machine Addresses (MAS), in accordance with an embodiment of the present invention.

FIG. 5 is a block diagram that schematically illustrates the use of TaaS in translation of Virtual Addresses (VAs) into Machine Addresses (MAS), in accordance with an embodiment of the present invention. For clarity, the figure shows only the relevant components of host 24 and NIC 28.

In the example of FIG. 5, system 20 comprises multiple ATS clients 136 that access (read or write) data 140 in host memory 44. A given ATS client 136 may be internal in NIC 28, or external to NIC 28. Typically, although not necessarily, each ATS client 136 maintains its own respective ATC independently of other ATS clients.

To access data 140, in an embodiment, ATS client 136 sends a TaaS request to TaaS unit 68 in NIC 28. The TaaS request (denoted "VA2MA req" in the figure) specifies a VA and requests a translation of the VA into a respective MA. TaaS unit 68 forwards the request to IOMMU 52, which in turn returns a translation response (denoted "MA resp") specifying the requested MA. TaaS unit 68 forwards the translation response to ATS client 136. In other words, TaaS unit 68 may have the requested translation in its ATC, and if not, will forward an ATS request to the IOMMU. Having obtained the MA, ATS client 136 can now access data 140 in memory 44 using the MA.

Note that, when using the scheme of FIG. 5, ATS client 136 should listen to ATC invalidation messages sent by NIC 28, and update their ATCs accordingly.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
a host interface, to communicate with a host over a peripheral bus;
a network interface, to send and receive packets to and from a network for the host;
packet processing circuitry, to process the packets; and
Translation-as-a-Service (TaaS) circuitry, which is integrated in the network adapter and is to:
receive from a requesting device a request to translate an input address into one or more requested addresses in a requested address space;
translate the input address into the one or more requested addresses independently of any actual memory access operation; and
return the one or more requested addresses to the requesting device.

2. The network adapter according to claim 1, wherein the TaaS circuitry is to receive a translation request specifying an input address for which no translation exists, and to respond to the translation request with a translation response indicating that no translation exists.

3. The network adapter according to claim 1, wherein the request specifies a requested size, and wherein the TaaS circuitry is to return, in the response, a memory range having the requested size.

4. The network adapter according to claim 1, wherein the input address comprises a network-adapter Virtual Address (VA).

5. The network adapter according to claim 1, wherein the input address comprises a key-address pair.

6. The network adapter according to claim 1, wherein the input address comprises a transport address.

7. The network adapter according to claim 1, wherein, in addition to returning the one or more requested addresses, the TaaS circuitry is to further return metadata corresponding to the one or more requested addresses.

8. The network adapter according to claim 1, wherein the one or more requested addresses comprise one of (i) a Virtual Address (VA), (ii) a Physical Address (PA) and (iii) a Machine Address (MA).

9. The network adapter according to claim 1, wherein the TaaS circuitry is to receive the request as a work-request posted on a queue pair (QP), and to return the one or more requested addresses by posting on the QP a completion notification specifying the one or more requested addresses.

10. The network adapter according to claim 1, wherein the input address points to one of (i) a contiguous memory range and (ii) a pattern of memory addresses.

11. The network adapter according to claim 1, wherein the request is received in response to an On-Demand Paging (ODP) page-fault notification in which the network adapter notifies the requesting device of an unmapped memory page, the request requesting an input address to which the unmapped memory page is to be mapped.

12. The network adapter according to claim 1, wherein the request specifies a Virtual Address (VA) in a logical volume defined on a storage device, the request requesting a corresponding address on the storage device.

13. The network adapter according to claim 1, wherein the request requests translation of a Virtual Address (VA) into a Physical Address (PA) responsively to receiving a storage command of a remote storage access protocol, the command specifying the VA.

14. The network adapter according to claim 1, wherein the request requests translation of the VA into a Physical Address (PA) responsively to encountering an Address Translation Service (ATS) permission error.

15. The network adapter according to claim 1, wherein the request requests translation of the input address into a Machine Address (MA).

16. A method in a network adapter, the method comprising:
communicating with a host over a peripheral bus;
sending and receiving packets to and from a network for the host; and
using Translation-as-a-Service (TaaS) circuitry, which is integrated in the network adapter:
receiving from a requesting device a request to translate an input address into a one or more requested addresses in a requested address space;
translating the input address into the one or more requested addresses independently of any actual memory access operation; and
returning the one or more requested addresses to the requesting device.

17. The method according to claim 16, wherein receiving the request comprises receiving a translation request specifying an input address for which no translation exists, and comprising responding to the translation request with a translation response indicating that no translation exists.

18. A network adapter, comprising:
a host interface, to communicate with a host over a peripheral bus;
a network interface, to send and receive packets to and from a network for the host;
packet processing circuitry, to process the packets; and
Translation-as-a-Service (TaaS) circuitry, which is integrated in the network adapter and is to:
receive from a requesting device a request to translate an input address into one or more requested addresses in a requested address space, wherein the input address comprises a network-adapter Virtual Address (VA), a key-address pair or a transport address;
translate the input address into the one or more requested addresses; and
return the one or more requested addresses to the requesting device.

* * * * *